Patented May 23, 1933

1,910,130

UNITED STATES PATENT OFFICE

JAMES M. SHERMAN, OF ITHACA, NEW YORK, ASSIGNOR TO THE WILBUR WHITE CHEMICAL COMPANY, OF OWEGO, NEW YORK, A CORPORATION OF NEW YORK

METHOD OF ACCELERATING THE PROPIONIC ACID FERMENTATION

No Drawing.  Application filed November 11, 1929.  Serial No. 406,542.

This invention relates to a method of accelerating the propionic acid fermentation by controlling the reduction potential in the fermentation medium.

It is known that when micro-organisms grow in a medium in the absence of free oxygen a reducing effect is produced. This reducing effect may be evidenced by the reduction of certain dyes, such as methylene blue. It is also known that the degree of reducing effect, as measured by the reduction potential, is different in the case of different micro-organisms or bacteria.

I have discovered that in the growth of the propionic acid producing bacteria, known under the name *Bacterium acidi-propionici*, and species of the genus *Propionibacterium*, and allied varieties, the reduction potential may fall to a point which retards the growth and rate of fermentation by the organisms, and I have further discovered that the rate of fermentation may be accelerated if the reduction potential is "poised" so that it does not reach this retarding or inhibiting point or zone and on the other hand is not too greatly reduced.

The following example will serve to illustrate my invention, it being understood that the invention is not limited thereto.

A fermentation medium consisting of 10 per cent molasses, 1 per cent dried yeast and 5 per cent calcium carbonate was placed in a flask and sterilized by autoclaving at 15 pounds pressure for 40 minutes. The sterilized medium was then inoculated with a culture containing a mixture of selected pure cultures of propionic acid producing bacteria and a pure culture of a lactic acid producing organism. An inoculum amounting to 7 per cent of the medium was used. The inoculated medium was then incubated at a room temperature of about 25° C. and after the second day was aerated vigorously for a one-half hour period twice each day.

For the purpose of comparison and to show the effect of controlling the reduction potential another body of the same fermentation medium, sterilized and inoculated in the same manner was incubated under a water seal so as to give practically complete anaërobic conditions and without control of the reduction potential.

The oxidation-reduction potential of the mediums was measured in terms of millivolts using the normal calomel electrode as the point of reference.

The medium which was fermented under the water seal gave the following readings:

After  2 hours, $-267$ millivolts
After  8 hours, $-400$ millivolts
After 48 hours, $-444$ millivolts The readings thereafter up to the end of 8 days remained practically constant, the fluctuation being between $-444$ and $-437$ millivolts.

The medium which was fermented with aeration after the second day and not under a water seal gave the following readings during the first two days of incubation:

After  2 hours, $-266$ millivolts
After  8 hours, $-400$ millivolts
After 48 hours, $-426$ millivolts At the end of 48 hours the medium was aerated for one-half hour immediately after which the reading was $-331$ millivolts. During the remainder of the fermentation period up to the end of 8 days the readings fluctuated between $-400$ and $-214$ millivolts.

It should be noted here that the above-described procedure or experiment was not carried out with a view to maintaining optimum reduction potential conditions but merely to show the effect of controlling the reduction potential. The periodic aëration naturally gave rise to considerable variation in the reduction potential during the fermentation period.

At the end of 5 days analysis of the medium which was fermented under the water seal showed 1.02 per cent of volatile acids and at the end of 8 days 1.64 per cent of volatile acids, while the medium which was fermented without a water seal and with periodic aëration as described showed at the end of 5 days 1.41 per cent of volatile acids and at the end of 8 days 2.09 per cent of volatile acids.

As is apparent from these results, fermentation was stimulated by controlling the reduction potential so that it was held above the region which is naturally attained by the culture medium under anaerobic conditions, that is to say, by maintaining the reduction potential less negative than it otherwise would be.

Other means of controlling the reduction potential may be employed and are within the scope of my invention which is not limited to aeration for this purpose, excepting as may be required by the appended claims. Certain chemicals, such as methylene blue and certain other dyes, manganese dioxide, potassium iodate, and nitrates, are known to be "poisers" of reduction potential and may be employed. The subject of poisers of reduction potential has been discussed in general in the literature by William Mansfield Clark and his co-workers; see Hygienic Laboratory Bulletin No. 151, "Studies in Oxidation-Reduction I-X".

The incorporation in the medium of air or oxygen during the fermentation, because of the inertness of molecular oxygen is a fairly easy means of preventing the development of an inhibiting degree of reduction potential without, on the other hand, too greatly raising it.

It should be understood that the process here described is not related in principle to methods of aeration as used in certain aerobic fermentations such as the "quick" vinegar process. The acetic acid bacteria of vinegar are aerobic in nature, that is, they require elementary oxygen for growth, and the object of aeration in the vinegar process is to supply an abundance of free oxygen for the bacteria, and hence to accelerate their action. The propionic acid bacteria are anaerobic and hence are not at all dependent upon free oxygen for growth. The process of the present invention depends upon controlling the reduction potential—a principle which has not heretofore, so far as I am aware, been recognized or utilized in industrial fermentations.

The more negative the potential, the more strongly reducing it is, whereas the more positive the potential the less strongly reducing it is. By "raising" the reduction potential I mean making the potential less negative and therefore less reducing.

I claim:

1. In the propionic acid fermentation process the step which consists in maintaining the reduction potential of the fermentation medium substantially less negative than that naturally attained by a medium fermented under anaerobic conditions.

2. In the propionic acid fermentation process the step which consists in introducing into the medium undergoing fermentation molecular oxygen in relatively small amounts effective to raise the reduction potential of the medium substantially above that naturally attained by such a medium fermented under anaerobic conditions.

3. Process as defined in claim 2, according to which the introduction of molecular oxygen is effected by introduction of limited amounts of air into the medium being fermented.

4. Process as defined in claim 2, according to which a poiser of reduction potential is employed in the medium being fermented.

In testimony whereof, I affix my signature.

JAMES M. SHERMAN.